(12) United States Patent
Shah et al.

(10) Patent No.: US 11,611,638 B2
(45) Date of Patent: Mar. 21, 2023

(54) RE-ASSEMBLY MIDDLEWARE IN FPGA FOR PROCESSING TCP SEGMENTS INTO APPLICATION LAYER MESSAGES

(71) Applicant: Tata Consultancy Services Limited, Mumbai (IN)

(72) Inventors: Dhaval Shah, Thane West (IN); Sunil Puranik, Pune (IN); Manoj Nambiar, Thane West (IN); Mahesh Damodar Barve, Pune (IN); Ishtiyaque Shaikh, Thane West (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 4 days.

(21) Appl. No.: 17/207,786

(22) Filed: Mar. 22, 2021

(65) Prior Publication Data
US 2022/0272178 A1 Aug. 25, 2022

(30) Foreign Application Priority Data
Jan. 22, 2021 (IN) .............................. 202121003213

(51) Int. Cl.
*H04L 69/12* (2022.01)
*H04L 49/9057* (2022.01)
*H04L 69/166* (2022.01)

(52) U.S. Cl.
CPC .......... *H04L 69/12* (2013.01); *H04L 49/9057* (2013.01); *H04L 69/166* (2013.01)

(58) Field of Classification Search
CPC . H04L 49/9057; H04L 49/9068; H04L 69/12; H04L 69/16; H04L 69/161; H04L 69/166
See application file for complete search history.

(56) References Cited

U.S. PATENT DOCUMENTS 6,963,921 B1 11/2005 Yang et al.
7,403,542 B1 * 7/2008 Thompson ............ H04L 69/163
709/250

(Continued)

FOREIGN PATENT DOCUMENTS

EP 3609108 A1 * 2/2020 ........... H04L 69/163

OTHER PUBLICATIONS

Langenbach, Ulrich, et al. "A 10 GbE TCP/IP hardware stack as part of a protocol acceleration platform." 2013 IEEE Third International Conference on Consumer Electronics ₹ Berlin (ICCE—Berlin). IEEE, 2013. (Year: 2013).*

(Continued)

*Primary Examiner* — Vivek Srivastava
*Assistant Examiner* — William C McBeth
(74) *Attorney, Agent, or Firm* — Finnegan, Henderson, Farabow, Garrett & Dunner, LLP

(57) ABSTRACT

A method and system of a re-assembly middleware in FPGA for processing TCP segments into application layer messages is disclosed. In recent years, the communication speed in digital systems has increased drastically and thus has brought in a growing need to ensure a good/high performance from the FPGA services. The disclosure proposes a re-assembly middleware in the FPGA for processing TCP segments into application layer messages at a pre-defined frequency for a good/high performance. The pre-defined frequency is a high frequency performance feature of the re-assembly middleware, wherein the FPGA's implementation frequency is at atleast 300 MHz based on a memory optimization technique. The memory optimization technique includes several strategies such registering an output and slicing memories.

13 Claims, 13 Drawing Sheets

(56) References Cited

U.S. PATENT DOCUMENTS

2013/0080651 A1* 3/2013 Pope .................... H04L 69/161 709/231
2018/0234360 A1 8/2018 Narayana et al.
2019/0174575 A1 6/2019 Shah et al.
2020/0053004 A1* 2/2020 Nambiar ............... H04L 69/164
2020/0162537 A1 5/2020 Waghmare et al.

OTHER PUBLICATIONS

Lockwood, John W., et al. "A low-latency library in FPGA hardware for high-frequency trading (HFT)." 2012 IEEE 20th annual symposium on high-performance interconnects. IEEE, 2012. (Year: 2012).*

Sidler, David, et al. "Scalable 10Gbps TCP/IP stack architecture for reconfigurable hardware." 2015 IEEE 23rd Annual International Symposium on Field-Programmable Custom Computing Machines. IEEE, 2015. (Year: 2015).*

Zhou, Feng, and Qingsheng Hu. "High-performance FPGA implementation of packet reordering for multiple TCP connections." 2011 11th International Symposium on Communications & Information Technologies (ISCIT). IEEE, 2011. (Year: 2011).*

Hamerski, Jean Carlo, Everton Reckziegel, and Fernanda Lima Kastensmidt. "Evaluating memory sharing data size and TCP connections in the performance of a reconfigurable hardware-based architecture for TCP/IP stack." 2007 IFIP International Conference on Very Large Scale Integration. IEEE, 2007. (Year: 2007).*

Leber, Christian, Benjamin Geib, and Heiner Litz. "High frequency trading acceleration using FPGAs." 2011 21st International Conference on Field Programmable Logic and Applications. IEEE, 2011. (Year: 2011).*

Tang, Qiu, et al. "A scalable architecture for low-latency market-data processing on FPGA." 2016 IEEE Symposium on Computers and Communication (ISCC). IEEE, 2016. (Year: 2016).*

* cited by examiner

RE-ASSEMBLY MIDDLEWARE IN FPGA FOR PROCESSING TCP SEGMENTS INTO APPLICATION LAYER MESSAGES

CROSS-REFERENCE TO RELATED APPLICATIONS AND PRIORITY

The present application claims priority from Indian provisional application no. 202121003213, filed on Jan. 22, 2021.

TECHNICAL FIELD

The disclosure herein generally relates to processing Transmission Control Protocol (TCP) segments into application layer messages in Field Programmable Gate Array (FPGA), and, more particularly, to a re-assembly middleware in FPGA for processing TCP segments into application layer messages.

BACKGROUND

A field-programmable gate array (FPGA) is an integrated circuit designed such that it may be configured by a designer or developer after manufacturing. FPGAs have established themselves as one of the preferred digital implementation platforms in current industrial applications/enterprise applications features. Application of FPGA is reported in several domains including computational domain, financial domain, IoT domain, data center applications, high frequency trading algorithm for the high performance.

In recent years, the communication speed in digital systems has increased drastically. The increase in communication speed has brought in a growing need to ensure a good/high performance from FPGA services, wherein the high/good performance includes a high throughput, a low latency, and a low resource utilization. In the state of art, different types of the accelerators are used to achieve the high performance, wherein accelerators can be defined as special purpose processors designed to speed up certain compute-intensive parts of applications. Further a lot of research is performed to get TCP Offload Engine (TOE) implemented in FPGA to enable good performance i.e. high throughput, low latency, and low memory utilization, wherein on the top of TOE, sits application layer, processing the received message. With the accelerators providing high performing, there is a need for FPGAs to adopt itself for performance at higher frequency.

SUMMARY

Embodiments of the present disclosure present technological improvements as solutions to one or more of the above-mentioned technical problems recognized by the inventors in conventional systems. For example, in one embodiment, a method for processing TCP segment into application layer message in a FPGA using a re-assembly middleware is provided. The method includes receiving a plurality of TCP segments via TCP from the client, wherein a channel-ID is assigned to a TCP segment from the plurality of TCP segments based on a channel from the plurality of channels that receives the TCP segment. The method further includes processing each of the TCP segment to an application layer message, wherein the step of processing each of the TCP segment from the plurality of TCP segments to an application layer message in a re-assembly middleware configured for implementation at a pre-defined frequency includes receiving the TCP segment at the message writer, processing the TCP segment to an application layer message at the message writer based on the pre-defined message offset length, the application layer message comprises of the application layer data, a set of control signals and a set of attributes. The step of processing TCP segment to an application layer message in a re-assembly middleware further includes receiving and saving the application layer data along with the set of control signals in the FIFO from the message writer. The step of processing TCP segment to an application layer message in a re-assembly middleware further includes assembling the application layer data along with the set of control signals in the FIFO from the message writer. The step of processing TCP segment to an application layer message in a re-assembly middleware further includes assembling the application layer data to obtain a complete application layer message in the FIFO the based on the set of attributes from the connection id queue and the set of control signals. The step of processing TCP segment to an application layer message in a re-assembly middleware further includes saving the set of attributes in the connection id queue, wherein the set of attributes comprises of the channel-ID of the TCP segment, a message length, and a start of message. The step of processing TCP segment to an application layer message in a re-assembly middleware further includes re-assembling the complete application layer message in the message reader in a pre-defined acceptable format based on the application layer message and the set of attributes from the connection id queue. Finally, the method includes analyzing the complete application layer message in the application layer for providing a service to the client.

In another aspect, a system for processing TCP segment into application layer message in a FPGA using a re-assembly middleware is provided. The system is configured for receiving a TCP Offload Engine (TOE) connected to at least one client via a Transmission Control Protocol (TCP) and configured to receive a plurality of TCP segments from the client via a plurality of channels. The system further comprises an application layer configured to provide the service to the client based on processing of the plurality of TCP segments, wherein the application layer (204) further comprises a functionality layer (206). The system further comprises a re-assembly middleware connecting the TOE and the application layer, wherein the re-assembly middleware is an independent middleware within the FPGA modular architecture configured for implementation at a pre-defined frequency based on a memory optimization to process each of the TCP segment from the plurality of TCP segments to obtain an application layer message. The re-assembly middleware comprises a message writer (msg_writer) designed for implementation at the pre-defined frequency, wherein the message writer is configured to process the TCP segments to the application layer message based on a pre-defined message offset length, wherein the application layer message comprises of the application layer data, a set of control signals and a set of attributes. The re-assembly middleware further comprises a connection id queue configured to save the set of attributes, wherein the set of attributes comprises of the channel-ID of the TCP segment, a message length, and a start of message. The re-assembly middleware further comprises a re-assembly First-In-First-Out (FIFO) designed for implementation at the pre-defined frequency, wherein the FIFO is configured to receive and save the application layer data along with the set of control signals and assembling the application layer data to obtain a complete application layer message based on the set of attributes from the connection id queue and the set of control signals. The re-assembly middleware further comprises message reader designed for implementation at the pre-defined frequency, wherein the message reader is configured to read the complete application layer message from the FIFO in a pre-defined format based on the set of attributes from the connection id queue. The re-assembly middleware further comprises an Advanced eXtensible Interface (AXI) configuration block configured for monitoring and configuring the re-assembly middleware for implementation at the pre-defined frequency.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
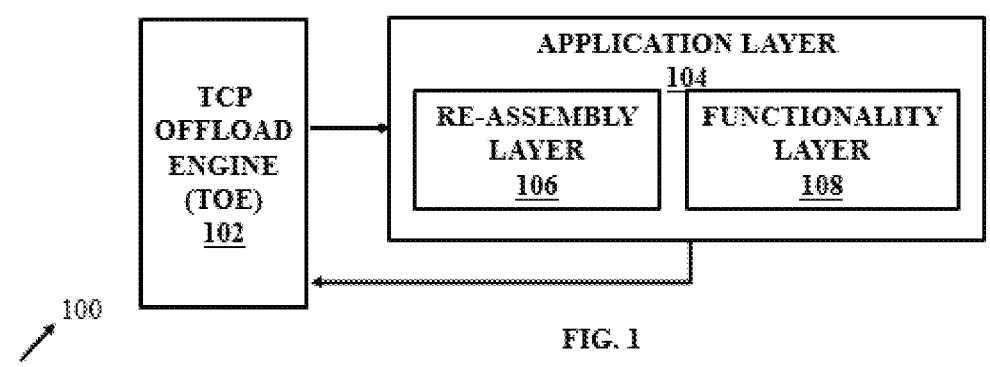
FIG. 1 illustrates a system for processing TCP segment into application layer message in an FPGA as known in art, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Clients usually connect over Transmission Control Protocol/Internet Protocol (TCP/IP) with the FPGA systems to service a request. The clients themselves may not be real users but high frequency trading engines, which place orders to utilize a sub second trading opportunity. Hence the FPGA must continually respond to the client's request with low latencies. At the same time there may be thousands of such co-located clients connected placing orders—in other words they must support high throughput of transactions implemented at a high frequency. Hence it is important is that there should be efficient response to the client's request by a FPGA, ideally in a high frequency with low latency as this can translate to millions of dollars of lost business. The clients typically have a standard Transmission Control Protocol (TCP) interface. It is thus essential that the FPGA respond fast for each request from the client, in the order of microseconds for large burst of incoming requests of the order of million orders per second.

Referring now to the drawings, and more particularly to FIG. 1 through FIG. 12 where similar reference characters denote corresponding features consistently throughout the figures, there are shown preferred embodiments and these embodiments are described in the context of the following exemplary system and/or method.

FIG. 1 illustrates a system for processing TCP segment into application layer message in a FPGA as known in art according to some embodiments of the present disclosure.

As depicted in the FIG. 1 a TOE 102 receives an input from a plurality of TCP segments from a client/network layer, and an output of the TOE 102 is connected to the input of the application layer 104. In the state of art, the application layer 104 is configured to extract the application layer message from the TCP segments in the re-assembly layer 106 and further application logic layer performs the specific functionality/task using a functionality layer 108. Hence the application layer 104 must perform a common functionality of extracting the application layer message as well as perform the application layer specific task. The clients typically have a standard Transmission Control Protocol (TCP) interface. It is thus essential that the FPGA respond fast, in the order of microseconds for large burst of incoming requests (TCP segments) of the order of million orders per second. Hence it is essential that the FPGA performs efficiently for high frequency with low latency.

Figure 2:
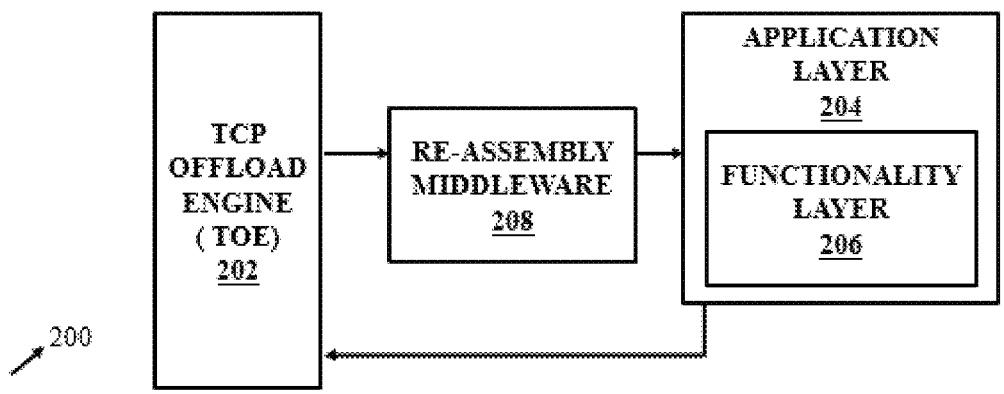
FIG. 2 illustrates an exemplary block diagram of an FPGA for processing TCP segment into application layer message using a re-assembly middleware in the FPGA according to some embodiments of the present disclosure.

FIG. 2 illustrates an exemplary FPGA system 200 for processing TCP segment into application layer message in a FPGA using a re-assembly middleware 208 according to some embodiments of the present disclosure.

As depicted in the FIG. 2, the re-assembly middleware 208 is an independent middleware. The re-assembly middleware 208 is a modular and a plug-play independent middleware extrinsic to the application layer but within the FPGA modular architecture. The re-assembly middleware 208 is operationally connecting the TOE 202 and the application layer 206, and wherein the re-assembly middleware 208 receives input from the TOE 202 and the output of the re-assembly middleware 208 is sent to the application layer 204, wherein a functionality layer 206 performs the application layer specific task. The re-assembly middleware 208 or the re-assembly layer 208 is configured to perform the common functionality of the application layer, wherein the common functionality includes processing TCP segment into application layer message 206. This disclosed extrinsic re-assembly middleware architecture has following advantage, i) modular approach for the application layer, ii) reusability across the application and iii) plug and play, which will be enable high performance of a high performance and a low latency logic. In the specification the terms/modules/components of re-assembly middleware and the re-assembly layer, have been used inter-changeably.

The FPGA system 200 for processing TCP segment into application layer message in a FPGA comprises of a TCP Offload Engine (TOE) 202 connected to atleast one client via a Transmission Control Protocol (TCP) being configured to receive a plurality of TCP segments from the client via a plurality of channels.

In an embodiment, the plurality of channels includes a channel-ID is assigned to a TCP segment from the plurality of TCP segments based on a channel from the plurality of channels that receives the TCP segment. In an example scenario the TOE 202 can support upto 64 K channels from which TCP segments are received into the FPGA via the TOE 202 from the client. Further the plurality of TCP segments is associated with a service, where the service is a specific task to be performed for the client by the FPGA. In an example scenario, the service request is associated with a web application for a) booking tickets in cinema or b) grocery purchase from an online store or c) data center application or d) servicing a request for stock exchange.

The system 200 further comprises of an application layer 204 configured to provide the service to the client based on processing the plurality of TCP segments. The functionality layer 206 within the application layer 204 is configured to perform an application specific task for several domains/applications. In an embodiment, the application specific task includes converting a TCP segment to an application layer message for a web application for a) booking tickets in cinema or b) grocery purchase from an online store, wherein the TCP segment is will book tickets for a customer or buy grocery for the customer/user.

The system 200 further comprises of the re-assembly middleware 208 operationally connecting the TOE 202 and the application layer 204. The re-assembly middleware 208 is an independent block within the FPGA modular architecture configured for implementation at the pre-defined frequency based on a memory optimization to process each of the TCP segment from the plurality of TCP segments to obtain an application layer message 204.

The re-assembly middleware 208 within the FPGA system 200 is an independent middleware that is a modular and a plug-play middleware extrinsic to the application layer 204 but within the FPGA modular architecture of system 200, wherein the re-assembly middleware 204 is operationally connecting the TOE and the application layer, and wherein the re-assembly middleware receives input from the TOE 202 and the output of the re-assembly middleware 208 is sent to the application layer 204. The re-assembly middleware 208 is configured for implementation at a pre-defined frequency based on a memory optimization to process each of the TCP segment from the plurality of TCP segments to obtain an application layer message In accordance with the present disclosure, the pre-defined frequency is a high frequency performance feature, where in in an embodiment the high frequency performance feature includes the FPGA implementation frequency of at least 300 MHz based on the memory optimization. The memory optimization is implemented for a memory, wherein the memory includes a message writer memory, a data segment memory and a descriptor memory. The memory optimization includes the following configurations/features in the FPGA architecture of system 200:

i) Registering an output for the memory, wherein registering is implemented by utilizing a register and an input controller at the output of the memory.
ii) Slicing the memory based on a pre-defined slicing threshold to enable the FPGA implementation at the pre-defined frequency, wherein the slicing includes a horizontal slicing and a vertical slicing.

In an embodiment, for the step of registering an output for the memory, a register and an input controller is placed at the output of the memory. The registering an output for the memory enables implementation at the pre-defined frequency by a) holding a data for one clock to synchronize the data for one clock cycle. b) Further by the process of registering the output of memory for two clock cycles. The FPGA system can be synthesized/implemented at the pre-defined frequency/higher frequency.

In an embodiment, the pre-defined slicing threshold is defined as slicing the memory optimally to enable implementation at the pre-defined frequency/higher frequency. The slicing includes a horizontal slicing and a vertical slicing and the type of slicing to be implemented on the memory is decided based on the pre-defined slicing threshold. The pre-defined slicing threshold is dynamically decided based on the pre-defined frequency, wherein if the memory under consideration is not meeting the frequency expectation as defined by the pre-defined frequency, then the pre-defined slicing threshold is violated and this particular memory is sliced.

The horizontal slicing comprises of n memories each of 1/nth address space, wherein each of the sliced horizontal memory is expressed as shown below:

$reg[(n-1):0]mem[x-1:0]$ to $m$ instances of $reg[floor(n/m)-1:0]mem[x-1:0]$.

The vertical slicing comprises separate memory for each bit of memory, wherein each of the sliced vertical memory is de-fined memory was change is expressed as shown below:

$reg[(n-1):0]mem[x-1:0]$ to $m$ instances of $reg[n-1:0]mem[floor(x/m)-1:0]$

The state of art FPGA systems uses 18k bits and 38k bit internal memory units to implement a large memory. A larger memory is constructed using combination of this memories. If large memory is created using small blocks, it can cause the combinational delay there by decreasing the clock frequency. So, in this slicing we avoid generating the large memories while using the smaller blocks of memory which improves the performance without affecting the functionality. Further the vertical slicing should be implemented first followed by the horizontal slicing only if it does not meet the pre-defined frequency implementation as there is addition of small combinational circuit overhead in the horizontal slicing.

In an example scenario, consider an FPGA system that needs to be implemented at a pre-defined frequency of 400 MHz. Hence to enable implementation at 400 MHz based on the memory optimization, the memory needs slicing as the FPGA does not support required pre-defined frequency implementation, wherein the pre-defined frequency implementation is considered as 400 MHz. As described in the above section the memory is optimally sliced, wherein the memory is first sliced vertically and if the FPGA does not still work as required at the pre-defined frequency, then horizontal slicing is performed. An example scenario is shared below, considering the pre-defined frequency as 400 MHz:

Original memory
Reg [63:0] mem [1023:0]
   Equivalent 2 Vertical sliced memory
Reg [63:0] mem1 [511:0]
Reg [63:0] mem2 [511:0]
   Equivalent 4 Vertical sliced memory
Reg [63:0] mem1 [255:0]
Reg [63:0] mem2 [255:0]
Reg [63:0] mem3 [255:0]
Reg [63:0] mem4 [255:0]
   Equivalent 2 horizontal sliced memory
Reg [31:0] mem1 [1023:0]
Reg [31:0] mem2 [1023:0]

Figure 3:
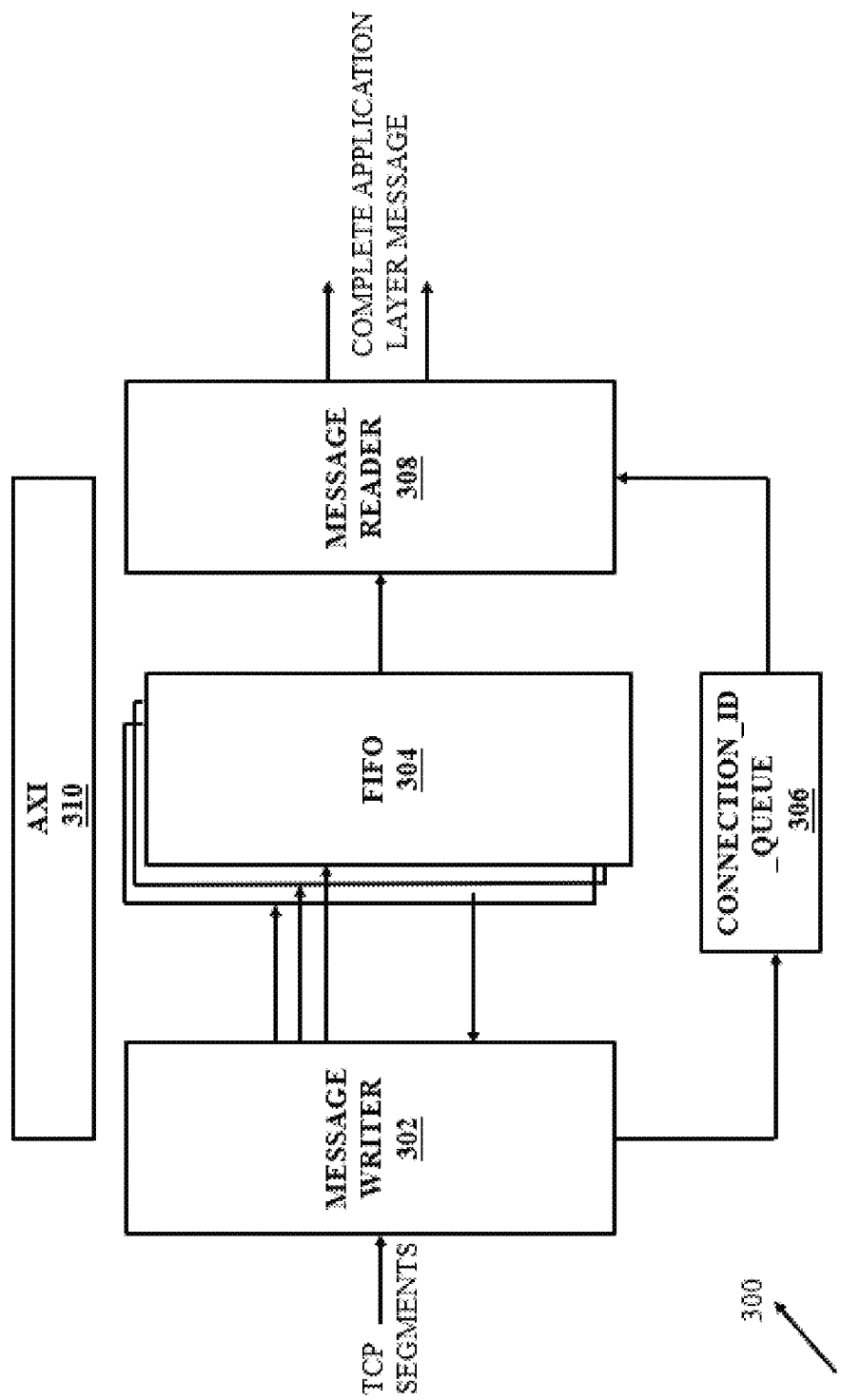
FIG. 3 illustrates a functional diagram of the re-assembly middleware in the FPGA for processing TCP segment into application layer message using a re-assembly middleware according to some embodiments of the present disclosure.

FIG. 3 is a functional block diagram 300 of the re-assembly middleware of the system 200 of FIG. 2, in accordance with some embodiments of the present disclosure. As depicted in the architecture, the FIG. 3 illustrates the functions of the components of the system 200 for processing TCP segment into application layer message in a FPGA using a re-assembly layer 208. The functional block diagram 300 of the re-assembly middleware of the system 200 is explained in the below section. Although the exemplary architecture of the functional block diagram represents a certain number of components, it may be understood that the number is only representative and may be configured as desired. For ease of description, the description hereinafter may be limited to the number of components illustrated in the accompanying drawings. Each of the plurality of components within the re-assembly middleware 208 within the FPGA system 200 as various functional units as described hereinafter.

In accordance with the present disclosure, the FPGA system 200 includes a message writer (msg_writer) 302 designed for implementation at the pre-defined frequency, wherein the message writer 302 is configured to process the TCP segments to the application layer message based on a pre-defined message offset length. The application layer message comprises of the application layer data, a set of control signals and a set of attributes. The TCP segments are processed in the re-assembly middleware 208 to obtain the application layer message based on a pre-defined message offset length.

The message writer (msg_writer) 302 within the re-assembly middleware 208 is configured to process the TCP segments to the application layer message based on a pre-defined message offset length.

In an embodiment, plurality of TCP segments comprises a plurality of information associated with the TCP segment that includes a TCP Offload Engine (TOE)_FIFO not empty (toe_fnempty), a TOE data (toe_data), a TOE end of TCP segment (toe_eos), a TOE start of TCP segment (toe_sos), a TOE byte valid parameter (toe_byte_vld), a TOE_connection ID (toe_conn_id), and a TOE error (toe_error).

The plurality of application layer messages are assembled in the FIFO 304 based on the message length and a plurality of application layer message includes a re-assembly valid (reasm_vld), a re-assembly start of message (reasm_som), a re-assembly end of message (reasm_eom), a re-assembly byte valid (reasm_bvld)) and a re-assembly data (reasm_data). The pre-defined message offset length is indicative of length of a message length of the application layer message.

Figure 4:
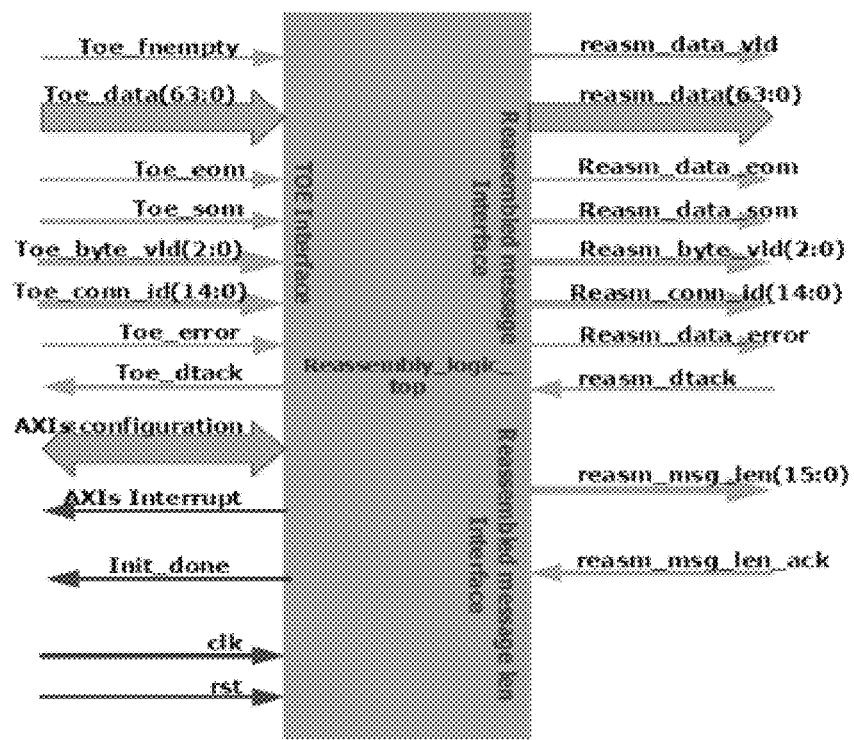
FIG. 4 illustrates a top level architecture of the re-assembly middleware for processing TCP segment into application layer message along with an input (a plurality of TCP segments) and an output (application layer message) according to some embodiments of the present disclosure.

The FIG. 4 illustrates a top level architecture of the re-assembly middleware with the input (a plurality of TCP segments) and the output (application layer message). Further an example scenario is illustrated in the FIG. 5, wherein an example of a plurality of TCP segments processed to obtain the application layer message by the re-assembly middleware 208 is shown. In the FIG. 5, the input which is the plurality of TCP segments is shown as a combination of partial and/or complete message. At output, the complete application layer message is displayed.

Figure 5:
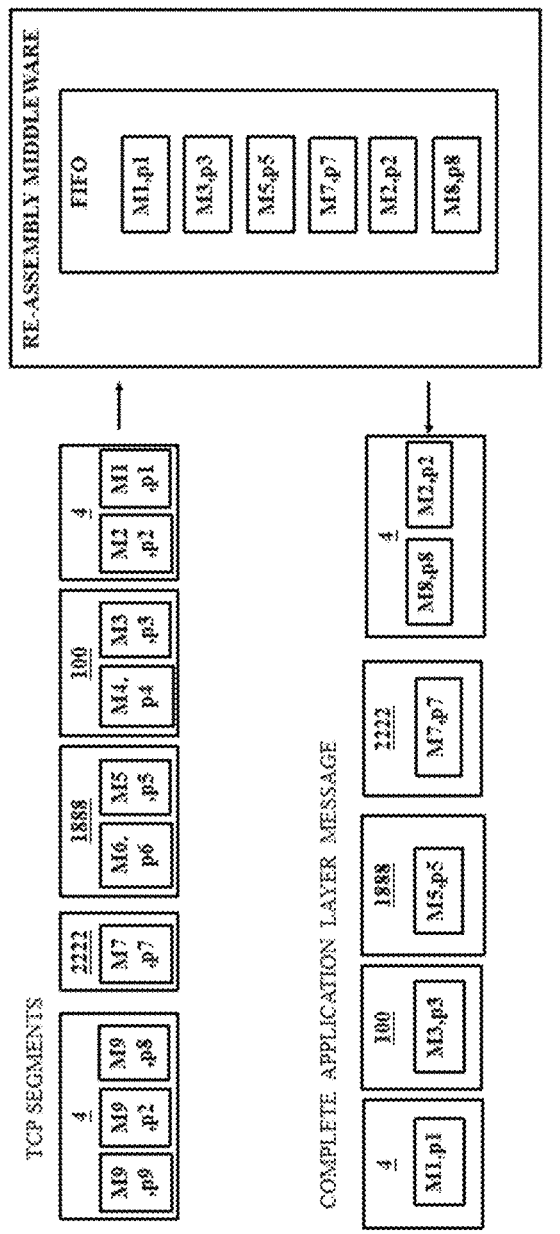
FIG. 5 illustrates an example scenario for processing TCP segment into application layer message along with an input (a plurality of TCP segments) and an output (application layer message) in the re-assembly middleware according to some embodiments of the present disclosure.
Figure 6:
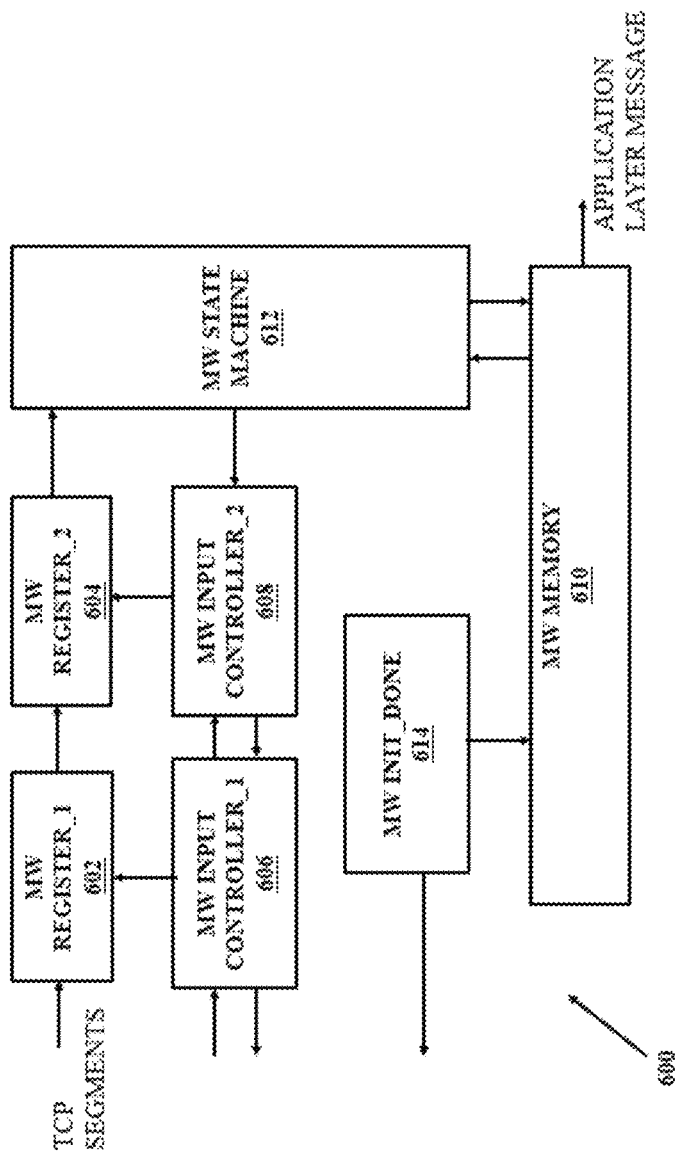
FIG. 6 illustrates an exemplary block diagram of a message writer within the exemplary system for processing TCP segment into application layer message in a FPGA using a re-assembly middleware according to some embodiments of the present disclosure.

In an embodiment, the FIG. 6 illustrates an exemplary block diagram of a message writer 302 within the exemplary system for processing TCP segment into application layer message in a FPGA using the re-assembly middleware. The message writer designed for implementation at a pre-defined frequency based on the memory optimization comprises:

i) a plurality of message writer registers configured for receiving, holding and passing the TCP segment for at least one cycle as controlled by a plurality of message writer input controllers. As depicted in FIG. 6, in an embodiment the message writer 302 includes two message writer registers represented as a mw register_1 602 and a mw register_2 604 and two message writer input controllers represented as a mw_input controller_1 606 and a mw input controller_2 608.

ii) The message writer memory configured based on the memory optimization for storing a set of channel information for a channel associated with the plurality of application layer message. The set of channel information includes a state, a message length, a value for bytes remaining for each of a application layer message from the plurality of application layer messages to a complete and a start of a set of message pointers for the channel. As depicted in FIG. 6 in an embodiment the message writer 302 includes a memory represented as a mw memory 610.

iii) a message writer state machine configured for operating in a pre-defined set of states for processing the plurality of TCP segments to the plurality of application layer messages. The pre-defined set of states includes a down-counting for message length, a boundary condition for the down-counting message length, an actual message down counting state and a boundary condition message down counting state. As depicted in FIG. 5, in an embodiment the message writer 302 includes a state machine represented as a mw state memory 612. In an embodiment, the state-machine contains four state, wherein a start of message, an end of message, and a data corresponding to end of segment gives valid bvld (words which may valid bytes other than 8). Further a hot encoding may also be utilized to improve frequency of implementation. In an example scenario, the four states include state 1, state 2, state 3 and state 4. The State 1, reads message until the message length, may contain start of message. Further the state 2 is optional and occurs in case, if only byte of message length was read in state 1. It is fixed for the 1 clock. Further the state 3 is for down-counting the message length till 0 and also reads out end of message. In case of end message the state 3 writes in the connection id queue, wherein a start of message, a connection id and a message length is written. Further the state 4 is optional and occurs if the TCP segment has more bytes than message to be completed, the state 4 always contain start of message and is fixed for one clock cycle.

iv) a message writer init_done logic configured for initializing the message writer memory to a pre-defined default state post a reset. As depicted in FIG. 6, in an embodiment the message writer 302 includes an init_done logic represented as a mw init_done logic 614.

In accordance with the present disclosure, the FPGA system 200 includes a connection id queue, 306 configured to save the set of attributes. The set of attributes comprises of the channel-ID of the TCP segment, a message length, and a start of message.

In an embodiment, connection id queue 306 is standard first in first out, with commit discard facilities. The connection id queue 306 receives its input from the message writer 302. The connection id queue 306 is configured to discard error segments and saving error free messages. The output of connection id queue 306 is read by the message reader 308.

In accordance with the present disclosure, the FPGA system 200 includes a re-assembly First-In-First-Out (FIFO) 304 designed for implementation at the pre-defined frequency, wherein the FIFO 304 is configured:

i) To receive and save the application layer data along with the set of control signals; and ii) For assembling the application layer data to obtain a complete application layer message based on the set of attributes from the connection id queue 306 and the set of control signals.

Figure 7:
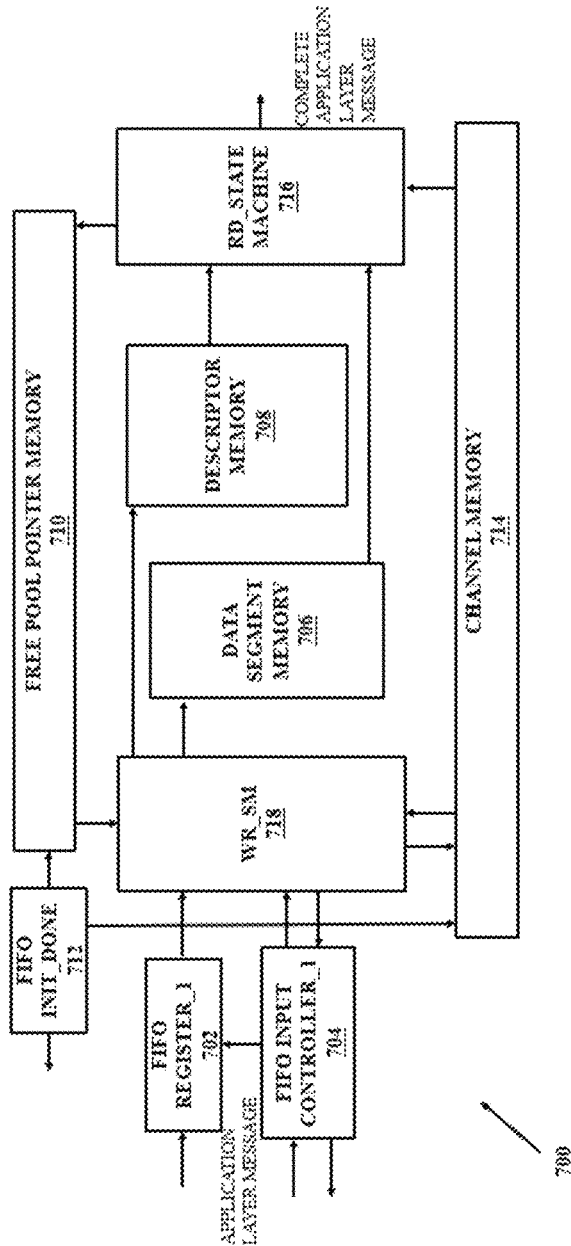
FIG. 7 illustrates an exemplary block diagram of a FIFO within the exemplary system for processing TCP segment into application layer message in a FPGA using a re-assembly middleware according to some embodiments of the present disclosure.

In an embodiment, the FIG. 7 illustrates an exemplary block diagram of a FIFO 304 within the exemplary system for processing TCP segment into application layer message in a FPGA using the re-assembly middleware. The FIFO 304 designed for implementation at a pre-defined frequency based on the memory optimization comprises:

i) A plurality of FIFO registers configured for receiving, holding and passing the application layer message for at least one cycle as controlled by a plurality of FIFO input controllers. As depicted in FIG. 7, in an embodiment the FIFO 304 includes the FIFO register represented as a FIFO register 702 and the FIFO input controller represented as a FIFO input controller 704.

ii) The data segment memory configured based on the memory optimization for storing the reasm_data of the application layer data. As depicted in FIG. 6, in an embodiment the FIFO 304 includes the data segment memory represented as a FIFO data segment memory 706.

iii) The descriptor memory configured based on the memory optimization for storing a descriptor for the data segment memory, where the descriptor includes a next descriptor, a next descriptor valid, the reasm_som, the reasm_eom, the reasm_bvld and the reasm_data. As depicted in FIG. 7, in an embodiment the FIFO 304 includes a descriptor memory represented as a FIFO descriptor memory 708.

iv) A free pool pointer memory configured for pointing to a set of free pools available. As depicted in FIG. 7, in an embodiment the FIFO 304 includes the free pool pointer memory represented as a free pool pointer memory 710.

v) A FIFO init_done configured for initiating the free pool memory and the descriptor memory. As depicted in FIG. 7, in an embodiment the FIFO 304 includes the FIFO init_done represented as a FIFO descriptor memory 712.

vi) A channel memory configured for indicating a current state of the channel-ID associated with the TCP segment. As depicted in FIG. 7, in an embodiment the FIFO 304 includes the channel memory represented as a channel memory 714.

vii) A read state-machine configured for reading from the descriptor memory and the data segment memory based on a set of control signals from the message reader. As depicted in FIG. 7, in an embodiment the FIFO 304 includes the read state-machine represented as a read state-machine 716.

viii) A write state-machine configured for writing to the descriptor memory and the data segment memory based on the set of control signals in the channel memory and the free pool pointer memory. As depicted in FIG. 7, in an embodiment the FIFO 304 includes the write state-machine represented as a write state-machine 718.

In accordance with the present disclosure, the FPGA system 200 includes a message reader 308 designed for implementation at the pre-defined frequency, wherein the message reader is configured to read the complete application layer message from the FIFO in a pre-defined format based on the set of attributes from the connection id queue 306. The pre-defined format is defined by the reasm_byte_bld or reasm_bvld, indicates a byte valid during end of message from the complete application layer message from the FIFO.

Figure 8:
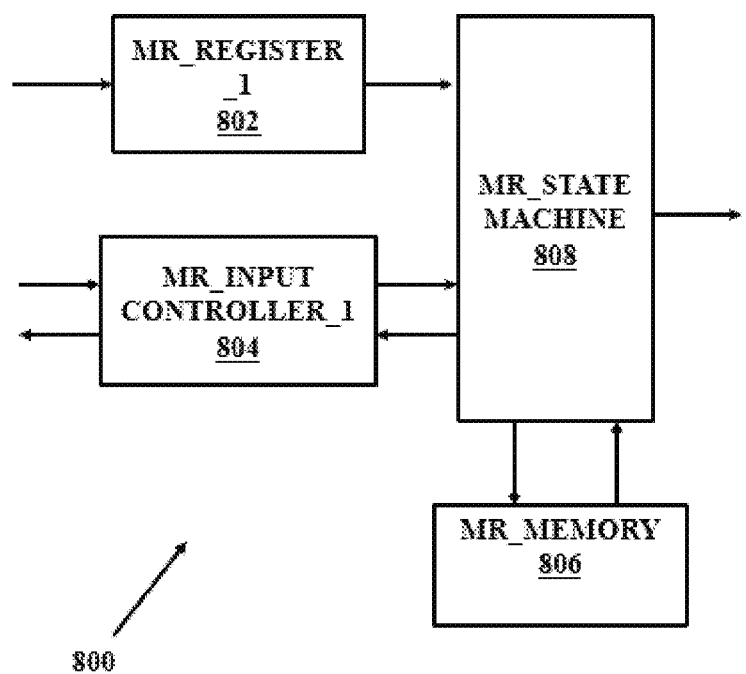
FIG. 8 illustrates an exemplary block diagram of a message reader within the exemplary system for processing TCP segment into application layer message in a FPGA using a re-assembly middleware according to some embodiments of the present disclosure.

In an embodiment, the FIG. 8 illustrates an exemplary block diagram of a message reader 308 within the exemplary system for processing TCP segment into application layer message in a FPGA using the re-assembly middleware. The message reader 308 designed for implementation at a pre-defined frequency based on the memory optimization comprises:

i) A plurality of message reader registers configured for receiving, holding and passing the application layer message for at least one cycle as controlled by a plurality of message reader input controllers. As depicted in FIG. 8, in an embodiment the message reader 308 includes the message reader register represented as a mr_register 802 and the message reader input controller represented as a mr input controller 804.

ii) A message reader memory configured for receiving a plurality of data from the FIFO, wherein the plurality of data is associated with the application layer message. As depicted in FIG. 8, in an embodiment the message reader 308 includes the message reader memory represented as a mr memory_1 806.

iii) A message reader state machine configured for assembling the application layer message based on the reasm_eom and the reasm_bvld. As depicted in FIG. 8, in an embodiment the message reader includes the state machine memory represented as mr_state machine 810.

In accordance with the present disclosure, the FPGA system 200 includes an Advanced eXtensible Interface (AXI) 310 configuration block configured for monitoring and configuring the re-assembly middleware for implementation at the pre-defined frequency.

In an embodiment, the AXI interface 310 is used by a plurality of clients of the FPGA system 200 to read the internal state of reassembly logic. Further the AXI interface 310 reads a set of statistic values like total number of input segments, total number of output message read etc., along with status registers.

Figure 9A:
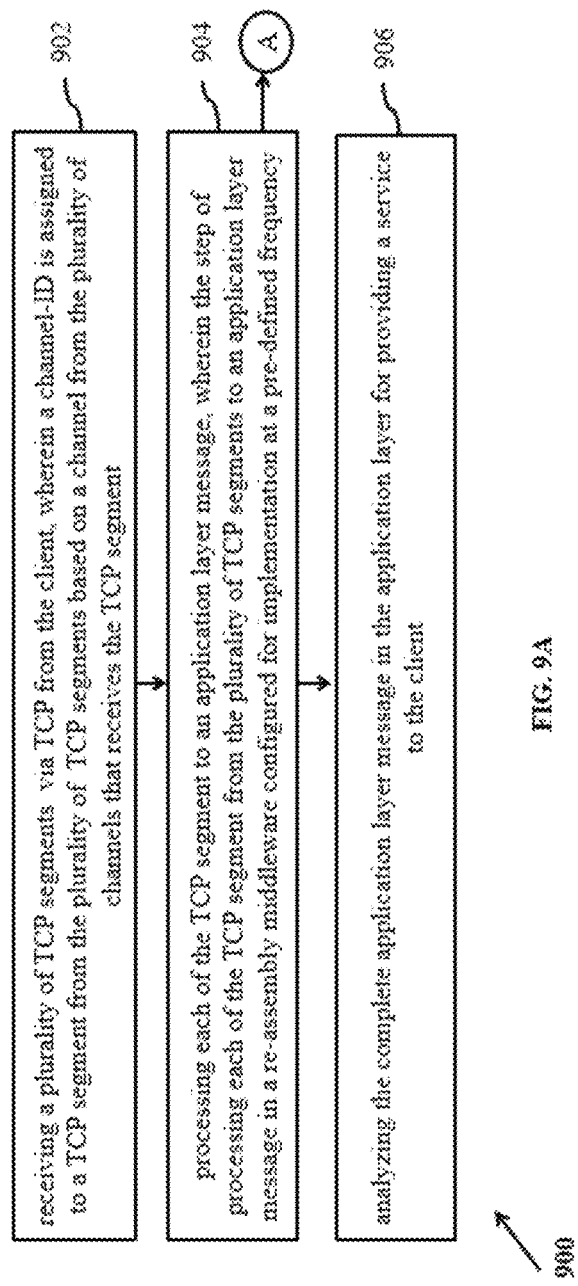
FIG. 9A, FIG. 9B and FIG. 9C is an exemplary sequence of operations (900) in the message writer while processing TCP segment into application layer message in a FPGA using a re-assembly middleware according to some embodiments of the present disclosure.
Figure 9B:
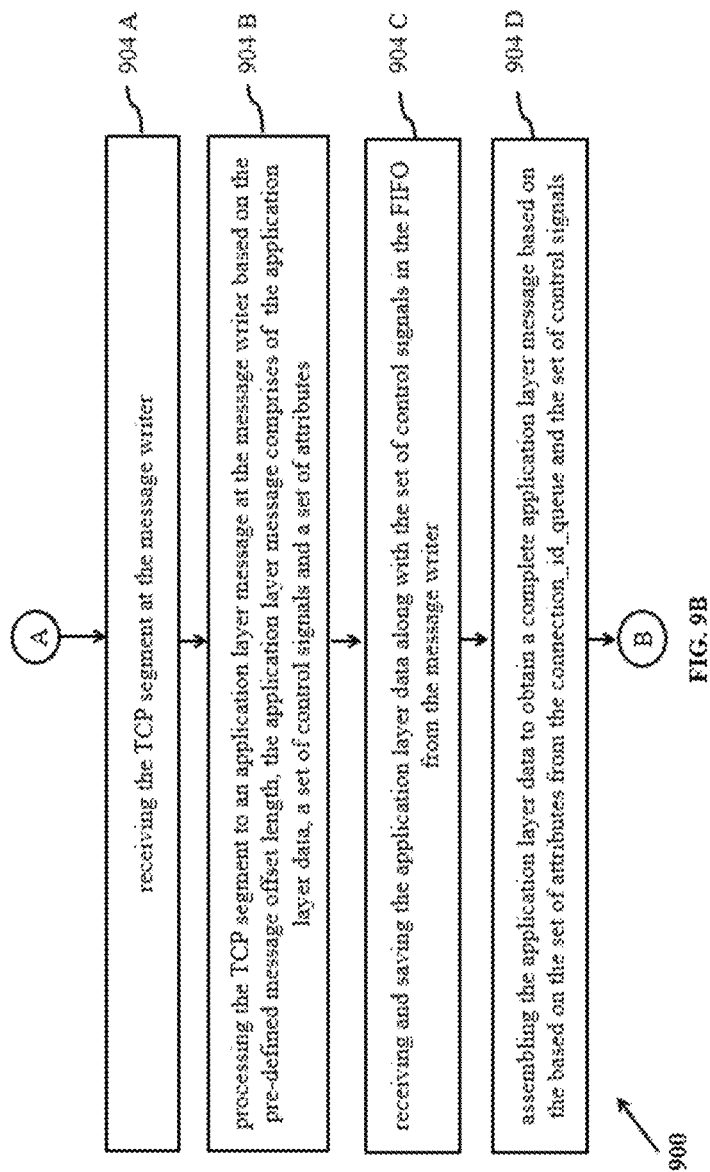
Figure 9C:
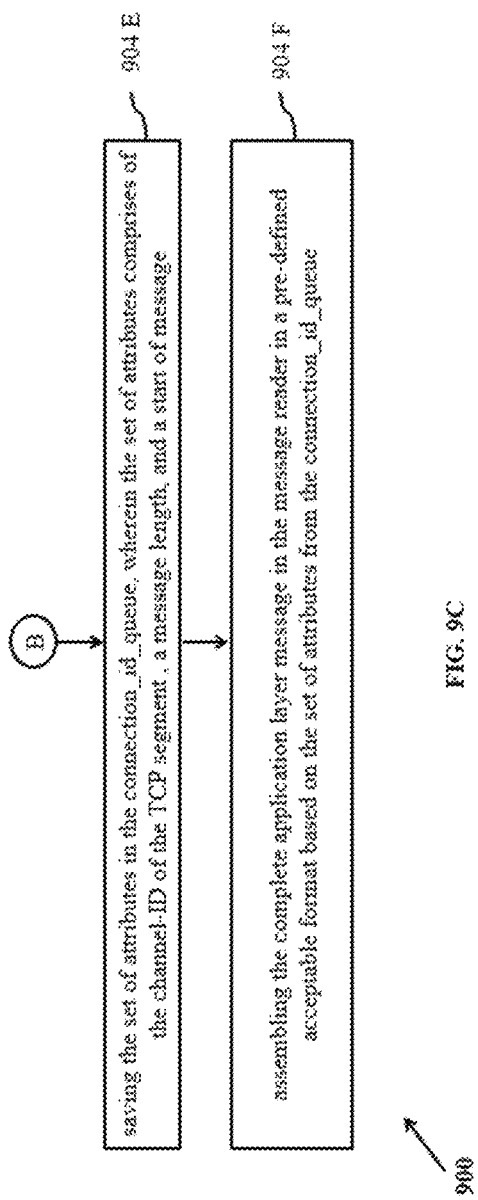

The functioning of the modules introduced in this section is further explained in detail using the flowchart illustrated in the FIG. 9A, FIG. 9B and FIG. 9C.

The various modules of the system 200 for processing TCP segment into application layer message in a FPGA using a re-assembly layer are implemented as at least one of a logically self-contained part of a software program, a self-contained hardware component, and/or, a self-contained hardware component with a logically self-contained part of a software program embedded into each of the hardware component that when executed perform the above method described herein.

Functions of the components of the system 200 are explained in conjunction with functional modules of the system 200 as depicted in FIG. 2 and FIG. 3 and further explained in conjunction with flow diagram of FIG. 9A, FIG. 9B and FIG. 9C. The FIG. 9A, FIG. 9B and FIG. 9C, with reference to FIG. 2 and FIG. 3, is an exemplary flow diagram illustrating a method 900 for using the system 200 of FIG. 2 according to an embodiment of the present disclosure.

The steps of the method of the present disclosure will now be explained with reference to the components of for processing TCP segment into application layer message in a FPGA using a re-assembly layer (200) as depicted in FIG. 2 and the modules (302-310) of the components of the re-assembly middleware 208 of FIG. 2 as depicted in FIG. 3 and the flow diagrams as depicted in FIG. 9A, FIG. 9B and FIG. 9C. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 902 of the method (900), the method includes receiving a plurality of TCP segments via TCP from the client by the TOE 202. Further a channel-ID is assigned to a TCP segment from the plurality of TCP segments based on a channel from the plurality of channels that receives the TCP segment. In an example scenario, considering a TCP segment received from a stock exchange, the channel ID indicates different stocks such as SBI, TCS, BPCL etc. Further considering an example of ordering grocery online, the channel ID indicates a particular item of grocery such as a specific brand of rice or a specific brand of wheat.

At the next step 904 of the method (900), each of the TCP segment is processed to an application layer message in the re-assembly middleware 208. The step of processing each of the TCP segment from the plurality of TCP segments to an application layer message in a re-assembly middleware 208 configured for implementation at a pre-defined frequency.

The step of processing each of the TCP segment to an application layer message in the re-assembly middleware 208 is depicted using the flow diagram in FIG. 9B and FIG. 9C and comprises of the following sub-steps:

At step 904A of the method (900), the TCP segment is received at the message writer 302.

At step 904B of the method (900), the TCP segment is processed to an application layer message at the message writer 302 based on the pre-defined message offset length, the application layer message comprises of the application layer data, a set of control signals and a set of attributes.

Figure 10:
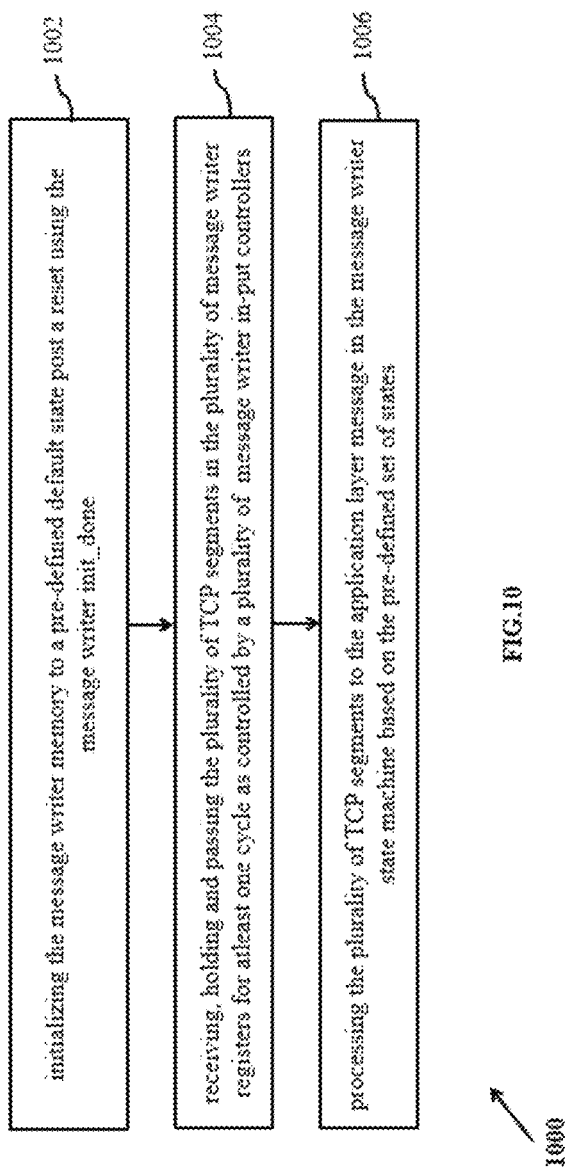
FIG. 10 is exemplary sequence of operations (1000) in the re-assembly First-In-First-Out (FIFO) while processing TCP segment into application layer message in a FPGA using a re-assembly middleware according to some embodiments of the present disclosure.

In an embodiment, the step of processing the TCP segment to the application layer message at the message writer 302 is depicted as an exemplary sequence of operations using the flow diagram 1000 in FIG. 10. The method 1000 in FIG. 10 includes the following sub-steps:

At step 1002 of the method (1000), the message writer memory 610 is initialized to a pre-defined default state post a reset using the message writer init_done 614;

At the next step 1004 of the method (1000), the plurality of TCP segments are received, held and passed in the plurality of message writer register (602 and 604) for atleast one cycle as controlled by a plurality of message writer input controllers (606 and 608); and At the next step 1006 of the method (1000), the plurality of TCP segments are processed to the application layer message in the message writer state machine 612 based on the pre-defined set of states.

Referring to the FIG. 9, at the step 904C of the method (900), application layer data along with the set of control signals is received from the message writer 302 and saved the in the FIFO 304.

At step 904D of the method (900), the application layer data is assembled to obtain a complete application layer message in the message writer 302. The application layer data is assembled to obtain a complete application layer message is based on the set of attributes from the connection id queue 306 and the set of control signals.

Figure 11:
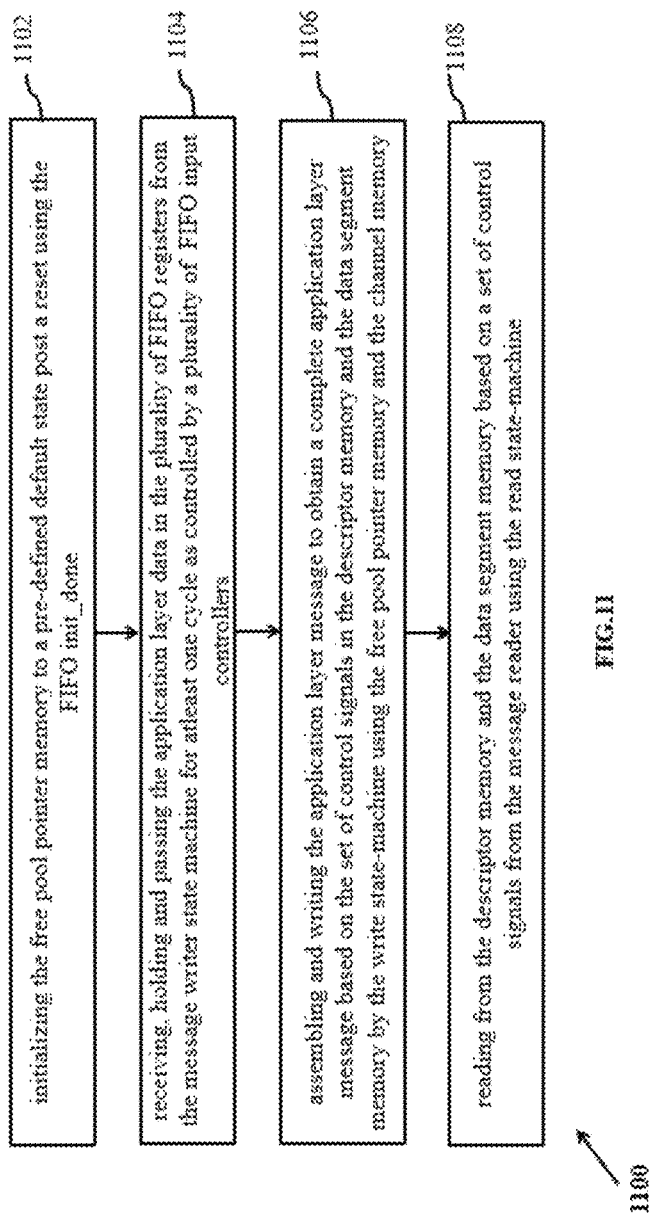
FIG. 11 is an exemplary sequence of operations (1100) in the message reader while processing TCP segment into application layer message in a FPGA using a re-assembly middleware according to some embodiments of the present disclosure.

In an embodiment, the step of assembling the application layer data to obtain a complete application layer message is depicted as an exemplary sequence of operations using the flow diagram 1100 in FIG. 11. The method 1100 in FIG. 11 includes the following sub-steps:

At step 1102 of the method (1100), the free pool pointer memory is initialized to a pre-defined default state post a reset using the FIFO init_done.

At step 1104 of the method (1100), the application layer data is received, held and passed in the plurality of FIFO registers from the message writer state machine for atleast one cycle as controlled by a plurality of FIFO input controllers.

At step 1106 of the method (1100), the application layer message is assembled and written in the descriptor memory and the data segment memory to obtain a complete application layer message based on the set of control signals by the write state-machine using the free pool pointer memory and the channel memory At step 1108 of the method (1100), the application layer message is read from the descriptor memory and the data segment memory based on a set of control signals by the message reader using the read state-machine.

Referring to the FIG. 9, at the step 904E of the method (900), the set of attributes is saved in the connection id queue 306. The set of attributes comprises of the channel-ID of the TCP segment, a message length, and a start of message.

At step 904F of the method (900), the complete application layer message is assembled in the message reader 308 from the application layer message. The assembly of the complete application layer message is implemented in the pre-defined acceptable format based on the set of attributes from the connection id queue 306.

Figure 12:
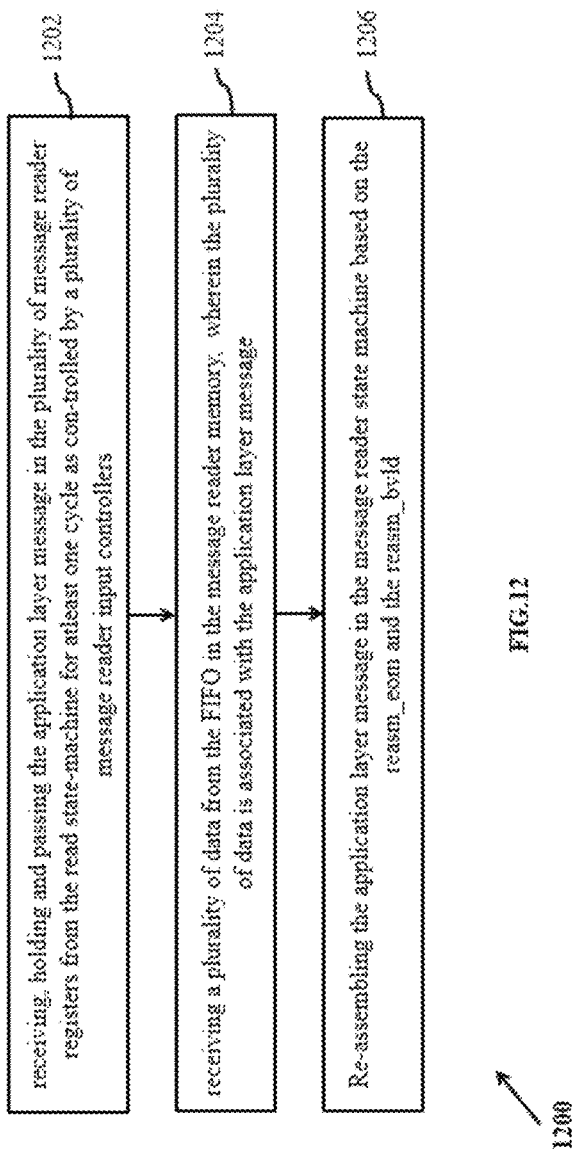
FIG. 12 is a flow diagram (1200) illustrating a method for processing TCP segment into application layer message in a FPGA using a re-assembly middleware according to some embodiments of the present disclosure.

In an embodiment, the step of re-assembling the complete application layer message in the message reader 308 is depicted as an exemplary sequence of operations using the flow diagram 1200 in FIG. 12. The method 1200 in FIG. 12 includes the following sub-steps:

At step 1202 of the method (1200), the application layer message is received, held and passed the in the plurality of message reader registers from the read state-machine for atleast one cycle as controlled by a plurality of message reader input controllers;

At the next step 1204 of the method (1200), a plurality of data is received from the FIFO 304 in the message reader memory 806, wherein the plurality of data is associated with the application layer message; and At the next step 1206 of the method (1200), the complete application layer message is re-assembling in the message reader state machine 810 based on the reasm_eom and the reasm_bvld from the application layer message Referring to the FIG. 9, at the next step 906 of the method (900), the complete application layer message is analyzed in the application layer 204 for providing a service to the client. As depicted in FIG. 2, the functionality layer 206 in the application layer 204 is configured to perform the application specific task.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

EXPERIMENTAL RESULTS

An experiment has been conducted using two close designs, Design 1 operating at lower frequency and Design 2 operating at higher frequency based on the method of the present disclosure.

The Design 1 comprises memories having output delay of 1 clock instead of output delay of 1 clock and also comprises of descriptor memory, data segment memory, channel memory from FIFO and memory from message writer. The Design 1 gives synthesize frequency at 150 MHz and implementation frequency was 116 MHz. Analysis showed memory is bottleneck, especially the memories of message writer and FIFO.

Hence the reassembly logic (Design 2) has been designed based on the disclosed memory optimization technique, wherein With this memory optimization and the reassembly logic (Design 2), the FPGA system works at implementation frequency above 400 MHz, although the synthesize frequency was around 367 MHz. Hence based on the re-assembly middleware and the memory optimization, the design 2 improves the frequency which increases from 116 MHz to 400 MHz post implementation as observed in Table 1. It was observed in Table 2, that power consumption had been optimized for Design 2, specifically dynamic power.

TABLE 1

Timing comparison post implementation

| Timing constraint w.r.t clock to clock constraint of 2.5 ns | Design 1 (worst negative slack) | Design 2 (worst negative slack) |
|---|---|---|
| Setup | −6.131 ns | +0.024 ns |
| % endpoint failing | 4.88% | 0 |
| Hold | +0.010 ns | +0.016 ns |
| PW | +0.500 ns | +0.500 ns |

TABLE 2

Power consumption comparison post implementation

| Power parameters | Design 1 | Design 2 |
|---|---|---|
| Total On-Chip Power (W) | 4.360 | 3.747 |
| FPGA Power (W) | 4.119 | 3.506 |
| HBM Power (W) | 0.242 | 0.241 |
| Dynamic (W) | 1.206 | 0.605 |
| Device Static (W) | 3.144 | 3.143 |

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

We claim:

1. A Field Programmable Gate Array (FPGA) for processing Transmission Control Protocol (TCP) segments into application layer messages, where the FPGA is a modular architecture, comprising:
    a TCP Offload Engine (TOE) connected to at least one client via a Transmission Control Protocol (TCP) and configured to receive a plurality of TCP segments from the at least one client via a plurality of channels, wherein a channel-ID is assigned to each TCP segment from the plurality of TCP segments based on a channel from the plurality of channels that receives said each TCP segment, and wherein the plurality of TCP segments is associated with a service comprising a specific task to be performed for the at least one client by the FPGA;
    an application layer configured to provide the service to the at least one client based on processing of the plurality of TCP segments, wherein the application layer further comprises a functionality layer; and
    a re-assembly middleware connecting the TOE and the application layer, wherein the re-assembly middleware is configured for implementation at a predefined frequency based on a memory optimization to process said each TCP segment from the plurality of TCP segments to obtain an application layer message, wherein the re-assembly middleware comprises:
        a message writer designed for implementation at the predefined frequency, wherein the message writer is configured to process said each TCP segment from the plurality of TCP segments to obtain the application layer message based on a predefined message offset length, wherein the application layer message comprises application layer data, a set of control signals and a set of attributes;
        a connection id queue configured to save the set of attributes, wherein the set of attributes comprises the channel-ID of said each TCP segment, a message length, and a start message indicator;
        a re-assembly First-In-First-Out (FIFO) designed for implementation at the predefined frequency, wherein the FIFO is configured to receive and save the application layer data along with the set of control signals and to assemble the application layer data to obtain a complete application layer message based on the set of attributes from the connection id queue and the set of control signals;
        a message reader designed for implementation at the predefined frequency, wherein the message reader is configured to read the complete application layer message from the FIFO in a predefined format based on the set of attributes from the connection id queue; and
        an Advanced eXtensible Interface (AXI) configuration block configured for monitoring and configuring the re-assembly middleware for implementation at the predefined frequency.

2. The FPGA of claim 1, wherein the predefined frequency is an FPGA implementation frequency of at least 300 MHz based on the memory optimization, wherein the memory optimization is implemented for a memory, wherein the memory includes a message writer memory, a data segment memory and a descriptor memory, and wherein the memory optimization comprises:
    registering an output for the memory, wherein the registering is implemented by the AXI configuration block by utilizing a register and an input controller at the output of the memory; and
    slicing the memory by the AXI configuration block based on a predefined slicing threshold to enable the FPGA implementation at the predefined frequency, wherein the slicing includes a horizontal slicing and a vertical slicing.

3. The FPGA of claim 1, wherein the re-assembly middleware is an independent middleware that is a modular and a plug-play independent middleware extrinsic to the application layer but within the FPGA modular architecture, wherein the re-assembly middleware is operationally connecting the TOE and the application layer, and wherein the re-assembly middleware receives input from the TOE and output of the re-assembly middleware is sent to the application layer.

4. The FPGA of claim 1, wherein said each TCP segment from the plurality of TCP segments comprises a plurality of information associated with said each TCP segment, the plurality of information including a TOE FIFO not empty indicator, a TOE data, a TOE end of TCP segment indicator, a TOE start of TCP segment-indicator, a TOE byte valid parameter, a TOE_connection ID, and a TOE error indicator.

5. The FPGA of claim 4, wherein the predefined message offset length is indicative of a message length of the application layer message as predefined by the at least one client and the predefined format is indicative of an end of a TCP segment for the application layer message based on the TOE end of the TCP segment indicator and the TOE byte valid parameter.

6. The FPGA of claim 1, wherein the application layer data is assembled in the FIFO based on the message length and wherein the complete application layer message includes a re-assembly valid-indicator, a re-assembly start of message indicator, a re-assembly end of message indicator, a re-assembly byte valid indicator and a re-assembly data.

7. The FPGA of claim 6, wherein the message reader comprises:
a plurality of message reader registers configured for receiving, holding, and passing the application layer message for at least one cycle as controlled by a plurality of message reader input controllers;
a message reader memory configured for receiving a plurality of data from the FIFO, wherein the plurality of data is associated with the application layer message; and
a message reader state machine configured for re-assembling the complete application layer message based on the re-assembly end of message indicator and the re-assembly byte valid indicator.

8. The FPGA of claim 1, wherein the message writer comprises:
a plurality of message writer registers configured for receiving, holding, and passing said each TCP segment from the plurality of TCP segments for at least one cycle as controlled by a plurality of message writer input controllers;
a message writer memory configured based on the memory optimization for storing a set of channel information for a channel associated with the application layer message, wherein the set of channel information includes a state, a message length, a value for bytes remaining for the application layer message and a start of a set of message pointers for the channel;
a message writer state machine configured for operating in a predefined set of states for processing said each TCP segment from the plurality of TCP segments to obtain the application layer message, wherein the predefined set of states includes a down-counting for message length, a boundary condition for the down-counting message length, an actual message down counting state and a boundary condition message down counting state; and
a message writer initialization logic configured for initializing the message writer memory to a predefined default state post a reset.

9. The FPGA of claim 1, wherein the FIFO comprises:
a plurality of FIFO registers configured for receiving, holding, and passing the application layer data for at least one cycle as controlled by a plurality of FIFO input controllers;
a data segment memory configured based on the memory optimization for storing a re-assembly data of the application layer data;
a descriptor memory configured based on the memory optimization for storing a descriptor for the data segment memory, wherein the descriptor includes a next descriptor pointer, a next descriptor valid indicator, a re-assembly start of message indicator, a re-assembly end of message indicator, a re-assembly byte valid indicator and the re-assembly data, wherein the next descriptor pointer indicates a location in the descriptor memory, and wherein the next descriptor valid indicator indicates a byte valid parameter;
a free pool pointer memory configured for pointing to a set of free pools available;
a FIFO initialization logic configured for initiating the free pool pointer memory and the descriptor memory;
a channel memory configured for indicating a current state of the channel-ID associated with the TCP segment;
a read state-machine configured for reading from the descriptor memory and the data segment memory based on a set of control signals from the message reader; and
a write state-machine configured for writing the application layer message in the descriptor memory and the data segment memory based on a set of control signals in the channel memory and the free pool pointer memory.

10. A Field Programmable Gate Array (FPGA) implemented method for processing Transmission Control Protocol (TCP) segments into application layer messages in a FPGA comprising:
receiving a plurality of TCP segments via TCP from at least one client, wherein a channel-ID is assigned to each TCP segment from the plurality of TCP segments based on a channel from a plurality of channels that receives said each TCP segment;
processing said each TCP segment from the plurality of TCP segments by a re-assembly middleware to obtain an application layer message, wherein the re-assembly middleware is configured for implementation at a predefined frequency, and wherein the processing by the re-assembly middleware comprises:
receiving said each TCP segment at a message writer;
processing said each TCP segment at the message writer based on a predefined message offset length to obtain the application layer message, wherein the application layer message comprises application layer data, a set of control signals and a set of attributes;
receiving and saving the application layer data along with the set of control signals in a re-assembly First-In-First-Out (FIFO) from the message writer;
assembling the application layer data to obtain a complete application layer message in the FIFO based on the set of attributes from a connection id queue and the set of control signals;
saving the set of attributes in the connection id queue, wherein the set of attributes comprises the channel-ID of each TCP segment, a message length, and a start of message indicator; and
re-assembling the complete application layer message in a message reader in a predefined format based on the application layer data and the set of attributes from the connection id queue; and
analyzing the complete application layer message in an application layer for providing a service to the at least one client.

11. The method of claim 10, wherein the step of processing said each TCP segment to the application layer message in the message writer comprises:
initializing a message writer memory to a predefined default state post a reset using a message writer initialization logic;
receiving, holding, and passing said each TCP segment in a plurality of message writer registers for at least one cycle as controlled by a plurality of message writer input controllers; and
processing said each TCP segment to obtain the application layer message by a message writer state machine based on a predefined set of states.

12. The method of claim 10, wherein the step of assembling the application layer data to obtain the complete application layer message in the FIFO comprises:
initializing a free pool pointer memory to a predefined default state post a reset using a FIFO initialization logic;

receiving, holding, and passing the application layer data in a plurality of FIFO registers for at least one cycle as controlled by a plurality of FIFO input controllers;

assembling and writing the application layer message in a descriptor memory and a data segment memory to obtain the complete application layer message based on a set of control signals by a write state-machine using the free pool pointer memory and a channel memory; and reading the complete application layer message from the descriptor memory and the data segment memory using a read state-machine based on a set of control signals from the message reader.

13. The method of claim 10, wherein the step of re-assembling the complete application layer message in the message reader comprises:

receiving, holding, and passing the application layer message in a plurality of message reader registers from a read state-machine for at least one cycle as controlled by a plurality of message reader input controllers;

receiving a plurality of data from the FIFO in a message reader memory, wherein the plurality of data is associated with the application layer message; and re-assembling the complete application layer message using a message reader state machine based on a re-assembly end of message indicator and a re-assembly byte valid indicator from the application layer message.

* * * * *